April 10, 1934. J. L. ADAMS, JR 1,954,511
METHOD AND APPARATUS FOR FORMING WELDED MATERIAL
Filed Aug. 13, 1930 4 Sheets-Sheet 1
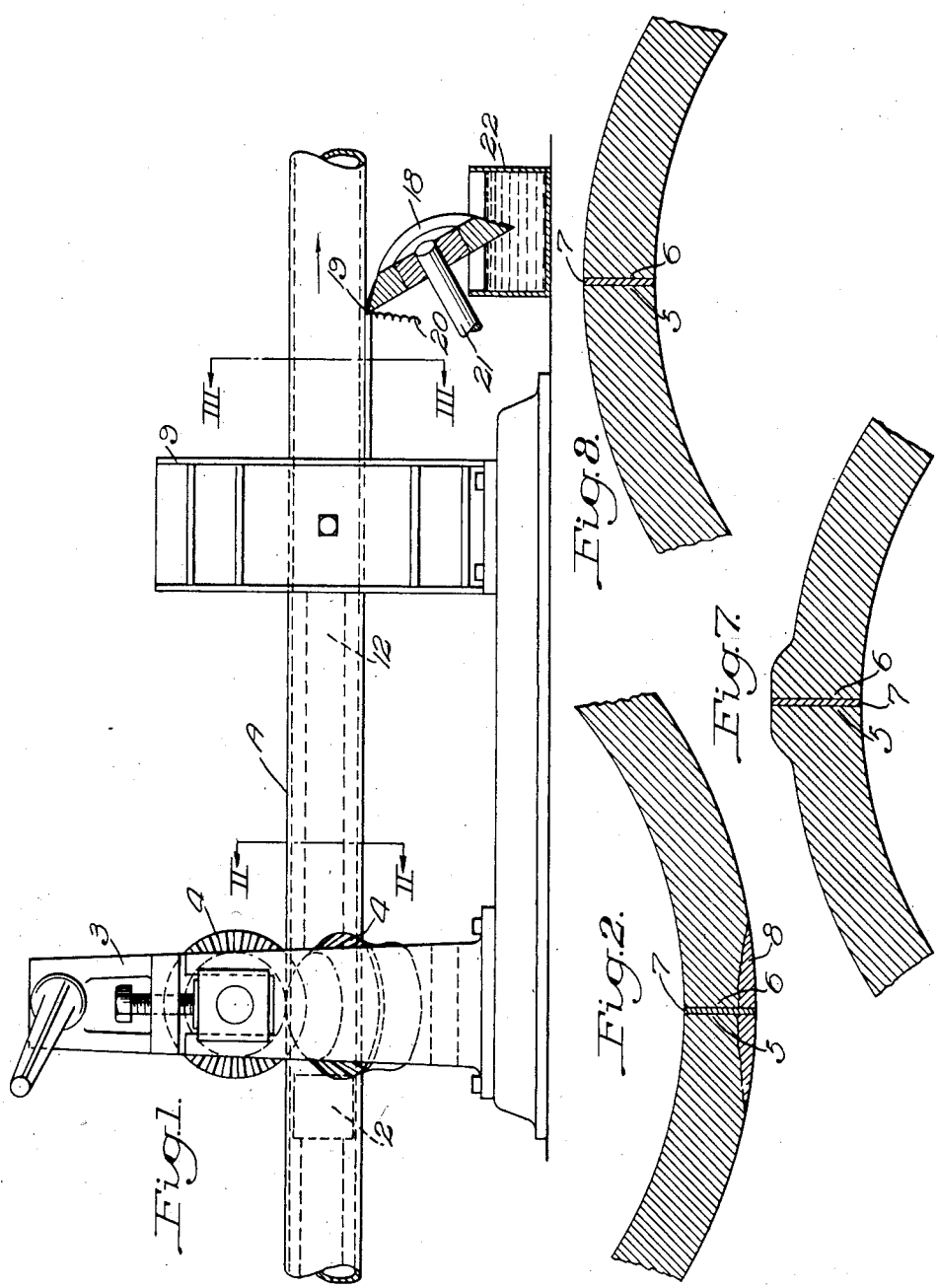
INVENTOR
James L. Adams, Jr.,
by his attorneys
Byrnes, Stebbins, Parmelee & Blenko April 10, 1934. J. L. ADAMS, JR 1,954,511
METHOD AND APPARATUS FOR FORMING WELDED MATERIAL
Filed Aug. 13, 1930 4 Sheets-Sheet 2
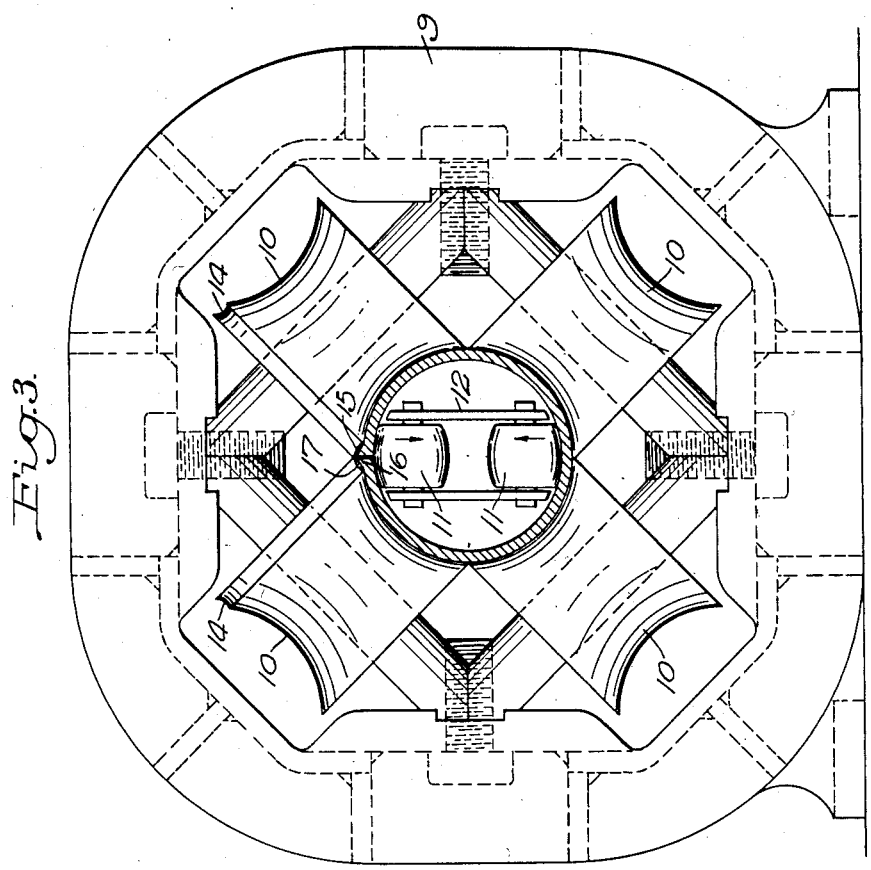
INVENTOR
James L. Adams, Jr.,
by his attorneys
Byrnes, Stebbins, Parmelee & Blenko April 10, 1934.  J. L. ADAMS, JR  1,954,511
METHOD AND APPARATUS FOR FORMING WELDED MATERIAL
Filed Aug. 13, 1930  4 Sheets-Sheet 3
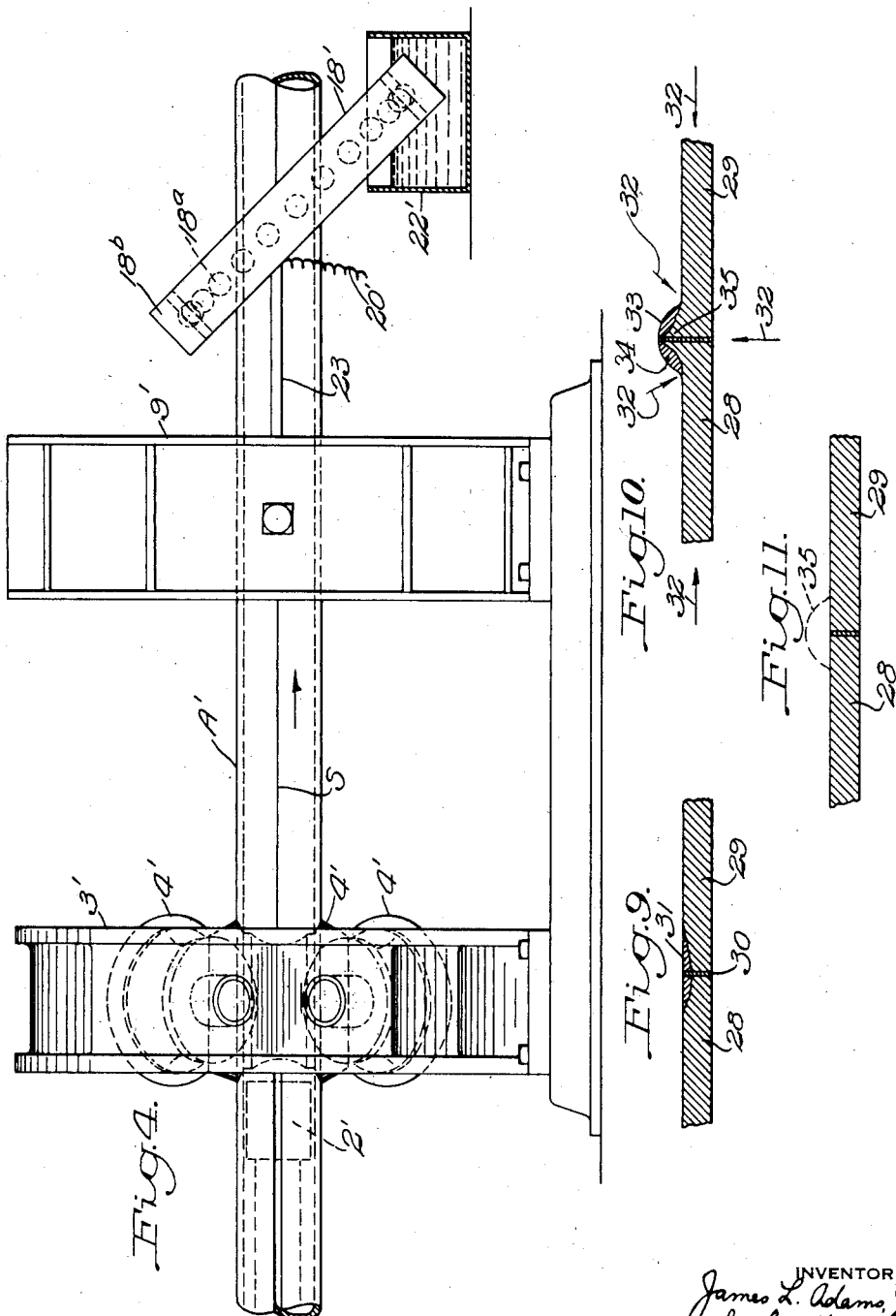

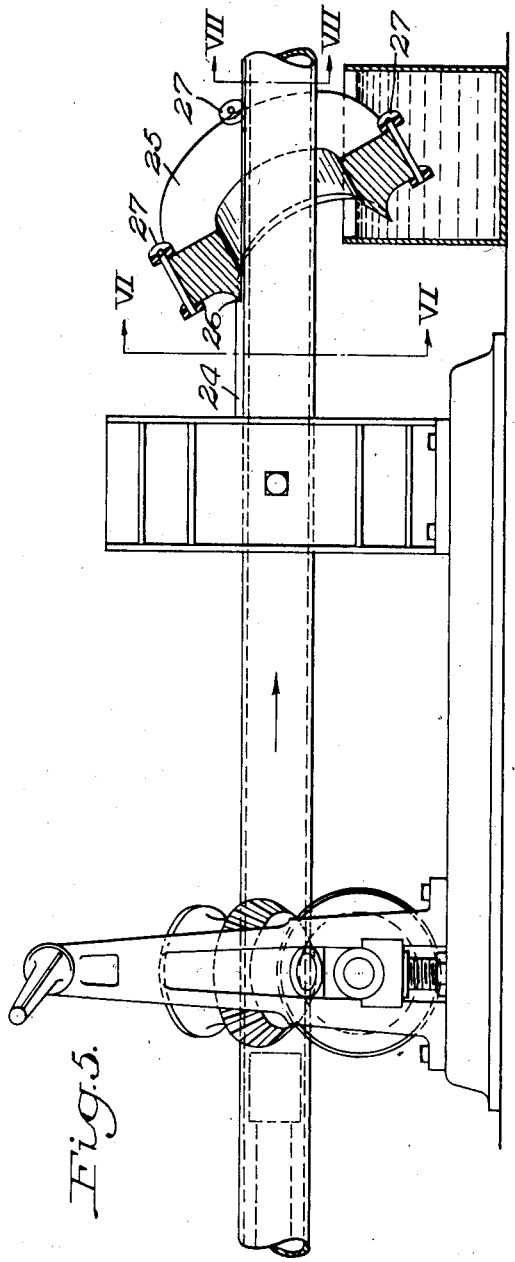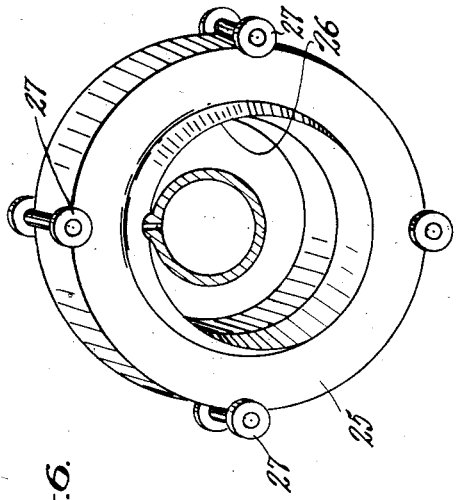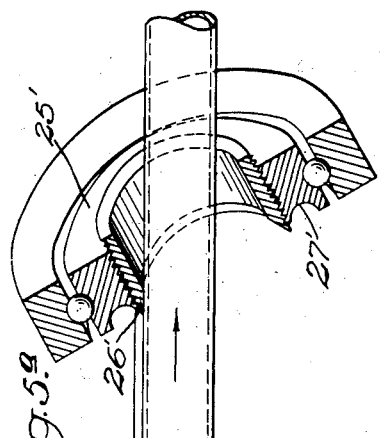

Patented Apr. 10, 1934

1,954,511

UNITED STATES PATENT OFFICE 1,954,511

METHOD AND APPARATUS FOR FORMING WELDED MATERIAL

James L. Adams, Jr., Youngstown, Ohio, assignor to The Youngstown Sheet & Tube Company, Youngstown, Ohio, a corporation of Ohio Application August 13, 1930, Serial No. 474,985

20 Claims. (Cl. 29—33)

The present invention relates broadly to the art of welding, and more particularly to an improved method and apparatus operative on the still highly heated seam of just previously welded material, for improving the solidity characteristics thereof.

The increasing use of electrically welded articles such as tubes, plates and the like, and the strict specifications which have been developed with respect thereto, make it desirable to subject seams produced by a welding operation to such treatment as not only to improve the characteristics of the grain structure of the parent metal adjacent the weld but also to improve both the solidity characteristics of the weld and the appearance thereof.

It is well recognized by those skilled in the art that most if not all welding operations of the type effective for producing a longitudinally extending seam in the article, require the application of very considerable pressure incident to bringing the heated portions being welded into such intimate engagement as to properly weld the same. Such pressure has necessarily been applied primarily with respect to the requirements for effecting the weld itself, and therefore not infrequently, when carried out by the use of pressure rolls, tends to roll into the weld certain foreign ejection materials, and/or portions of the material which have been extruded, or other portions imperfectly welded. In either case, the mechanical strength of the weld is reduced to the extent that such foreign materials or imperfectly welded parts are pressed into the seam, and the adjacent metal surfaces. Not only that, but all imperfectly welded parts, or rolled in inclusion materials with very imperfect adhesion to the main body of the metal, provide subsequently entrance points for soil corrosion liquids.

It is one of the objects of the present invention to provide an improved method and apparatus by means of which material so produced is subjected immediately and while still bright hot, to after operations of such nature that the grain structure of the parent metal on opposite sides of the line of weld is refined and improved, and such that not only are all undesirable inclusions or intrusions both in the weld itself and in adjacent surfaces, displaced therefrom and preferably entirely or partly removed, but this is done in such manner as to leave all the original depressions occupied by such foreign inclusion materials, filled up with solid metal to the normal surface contour line determined upon. Such a removal, while generally desirable, as where the appearance of the finished article is of importance, may of course be omitted in cases where the appearance of the material is not a factor in either the sale or the use thereof.

In the accompanying drawings, there are shown more or less diagrammatically for purposes of illustration only, and not purposes of limitation, certain preferred embodiments of the present invention. In the drawings:

Figure 1 is a view partly in side elevation and partly in section, illustrating one embodiment of the invention;

Figure 2 is a partial transverse sectional view on the line II—II of Figure 1, looking in the direction of the arrows;

Figure 3 is a transverse sectional view on the line III—III of Figure 1, looking in the direction of the arrows;

Figures 4, 5 and 5a are views similar to Figure 1, but illustrating other embodiments of the invention;

Figure 6 is a transverse sectional view on the line VI—VI of Figure 5, looking in the direction of the arrows;

Figure 7 is a transverse sectional view on the line VII—VII of Figure 5 looking in the direction of the arrows;

Figure 8 is a view similar to Figure 7 illustrating a slightly different method of carrying out the invention;

Figure 9 is a partial transverse sectional view through a portion of a welded article as it comes from the welding apparatus;

Figure 10 is a view of the same article illustrated in Figure 9 after the same has been immediately subjected to pressure in accordance with my invention; and Figure 11 is a view of the article of Figures 9 and 10 in finished form.

Inasmuch as the apparatus by means of which the weld itself is initially produced constitutes no part of the present invention, I have herein only illustrated such an apparatus 2 in Figure 1, in diagrammatic outline. This apparatus is shown as including a stand 3 having pressure applying rolls 4 therein by means of which the desired pressure for effecting the welding operation is imparted to the article A being welded. In this figure this article is illustrated as being of tubular configuration, although the particular configuration or constructional characteristics of the article constitute no limitation to the practicing of my invention.

The article having been subjected to welding pressure may be considered as having a form substantially as illustrated in Figure 2 in which the adjacent edges 5 and 6 are shown as having been brought together to form a seam or weld 7. Due to the difficulties encountered in a welding operation, welded joints of the general character herein contemplated are usually characterized by inclusions 8 pressed into the metal at and adjacent the seam itself. These inclusions may comprise portions of the parent metal which have been either welded and extruded as a fin, or materials which have been imperfectly welded and which therefore constitute in reality projecting portions of metal which are lapped over and into the main body of the article, or such inclusions may consist largely of more or less agglomerated and cooled-off particles or strips, originally ejected as hot vapor and liquid from the seam, during the heating-up operation. This latter being the more usual case met with.

In case the pass defined by the pressure applying means for effecting the weld is such as to produce a bead or burr along the seam, inclusions of the character referred to very often lie outside of such bead or burr, as well as within the same.

Such articles, previously welded and of the general characteristics referred to are, in the present invention, subjected to a special treatment whereby complete removal of inclusions and foreign particles embedded in the outside tube surfaces is insured, with a simultaneous refinement of the grain structure of the metal adjacent the weld. To this end I have illustrated more particularly in Figure 3 of the drawings a stand 9 having a series of working rolls 10 therein preferably of such construction as to substantially completely enclose the welded article where it is of tubular or generally similar cross sectional configuration. Inside rolls 11 suitably carried, preferably by the welding apparatus through a forwardly extending projection 12 thereon, may also be provided so as to act on diametrically opposite portions of the article and particularly adjacent the line of weld itself. It will be noted from the Figure 3 that the two working rolls 10 effective on opposite sides of the weld are cut away as indicated at 14 to provide a space 15 into which metal is extruded or caused to flow under the pressure of the working rolls.

By employing welding rolls having continuous, smooth, arcuate faces, I avoid any tendency for the hot edges of the seam to slip past each other. It will be understood that the hot seam edges are relatively slippery and, if burned off at an angle to a true radius of the tube, they may slip out of the proper relation unless positively held therein. The welding rolls just mentioned accomplish this function satisfactorily. The grooved rolls in the subsequent stand 9, however, permit the shaping of the now solidly welded but still very hot seam so that the impurities are raised into a rib external to the seam for later easy removal.

In the figure of the drawings just referred to, the resulting shape of the material is illustrated, this figure showing a substantially radially extending projection comprising in part sound metal 16 and in part objectionable inclusions 17, the inclusions obviously lying along the extreme outside of the rib. In this position the article may be subjected to a suitable operation for removing the rib in whole or in part. For this purpose I have illustrated in Figure 1 an annular cutting tool 18 having its cutting edge 19 in position to remove the rib, the removed portion being indicated at 20. Where a cutting tool of the general type herein illustrated is employed, it may be either positively driven through the medium of a suitable shaft 21 or may be merely carried by such shaft at such an inclination to the article that the forward travel thereof is effective for rotating the cutting tool.

The cutting edge 19 may be integral with the body of the tool 18 or formed on a separate ring as indicated.

Due to the temperature conditions to which the cutting tool is subjected, as well as by reason of the heat generated by the shearing operation, I may provide means for continuously cooling such tool. In Figure 1 such cooling means is illustrated in the form of a tank 22 filled with water in which a portion of the periphery of the cutting tool is adapted to dip, although such cooling may be by means of a suitable jet system.

In Figure 4 there is shown a form of apparatus generally similar to that just described, and in which parts corresponding to parts referred to in detail are designated by the same reference characters having a prime affixed thereto. In this figure the article A' instead of having a bottom seam as present in the construction of Figure 1, has a side seam S formed therein by the welding apparatus 2'. By reason of the pressure to which the article is subjected by the stand 9' there is formed an enlarged rib 23 of the character before referred to, which is removed by a cutting tool 18'. This tool may be generally of ring-shaped construction and is shown as surrounding the material and having an inside cutting edge for removing the rib, and is effective against one side of the material as distinguished from the bottom thereof. The annular cutter is supported on ball bearings 18a rotating in a race 18b.

In Figure 5 the welding apparatus and working stand are of the same construction as that before referred to, and are effective for producing an article having a top rib 24. In this case, likewise, the cutter 25 is annular in shape and has an inside cutting edge 26. The cutting tool in such case may be supported in any desired manner, as, for example, by suitable flanged rollers 27 cooperating therewith to maintain such an angularity of the cutting tool and position thereof as to insure the desired cutting operation. In Figure 5 the tool is indicated as being so supported as to only partly remove the bead or rib 24, thereby forming an article of the construction illustrated generally in Figure 7 in which the metal is thickened adjacent the seam. It is obvious, however, that with this form of cutting tool the position of the tool may be such as to completely remove the rib.

Figure 5a illustrates a further modified form of cutting tool which is similar in general to that shown in Figure 5. A ring-shaped cutter 26' is received within an annular holder 25'. The holder 25' is mounted on ball bearings, as in the case of the construction shown in Figure 4. The cutter 26' is adjustable with respect to the holder 25', having threaded engagement therewith, to compensate for wear. Obviously, other adjusting means for the cutter may be substituted for the threaded section shown. The holder 25' is provided with a groove 27' which allows for clearance of the chips cut from the seam.

In Figures 9, 10 and 11 the method characterizing the present invention is illustrated diagrammatically in connection with the treatment of plates 28 and 29 welded as indicated in Figure 9 at 30 with inclusions 31 adjacent the weld. By the application of suitable pressure to the still hot and just welded seam, as indicated diagrammatically by the arrows 32 in Figure 10, there is formed a bead 33 consisting in part of the inclusions 34 and in part of sound metal 35. In Figure 11 there is illustrated a portion of the finished article in which the bead 35 indicated in dotted lines has been completely removed.

It is also possible with my invention to trim the welded seam free from impurities, as shown in Figure 8, and subsequently to produce a raised rib from the seam, as shown in Figure 7. This could be done merely by passing the articles through a set of thickening rolls, which would force the still hot intermediate or "transition-zone" material adjacent the line of weld outwardly therefrom to form a rib thereon.

In addition to obtaining the advantages incident to the removal of inclusions and the like from the zone of the weld, whereby the strength of the finished article is increased, the present invention possesses the advantages of performing work on the article to such an extent that the portions of the parent metal on opposite sides of the seam are forced toward each other, causing further ejection of the hottest seam metal and therefore the coarser grained materials, into the new bead or fin, and leaving the intermediate or transition-zone metal having refined grain structure to be brought together at the final seam line. This insures an article in which the grain structure characteristics at the seam are equal or superior to the grain structure of the parent body from which the article was formed, since such transition zone metal usually shows a more refined and tougher grain than the parent metal itself more remote from the seam.

It will also be apparent that by means of the present invention the articles may be definitely sized by the action of the final work rolls whereby the finished article is brought within the tolerances allowed by the specifications governing its manufacture.

While I have herein illustrated and described certain preferred embodiments of the invention and certain preferred methods for obtaining the advantages incident thereto, it will be understood that changes in the apparatus as well as the method of practicing the invention may be made without departing either from the spirit thereof or the scope of my broader claims.

I claim:

1. The combination with welding apparatus, of seam thickening means cooperating therewith, and means for removing a portion of the thickened seam.

2. The combination with welding apparatus, of pressure applying rolls for producing a projecting bead on the article delivered by such apparatus, and means for removing a portion of such bead.

3. The combination with welding apparatus, of pressure applying means for producing a projecting bead on the article delivered by such apparatus, and means for removing a portion of such bead, said means comprising a rotary cutting tool.

4. The combination with welding apparatus, of pressure applying rolls disposed peripherally of a welded article for producing a projecting bead on the article delivered by such apparatus, and means for removing a portion of such bead, said means comprising a rotary shearing tool.

5. The combination with welding apparatus, of seam thickening means, and a shear operated by the material being welded for removing a portion of the thickened seam on such material.

6. The combination with welding apparatus, of seam thickening rolls disposed peripherally of a welded article, and a shear operated by the material being welded for removing a portion of the thickened seam on such material, there being means for cooling said last mentioned means.

7. Mechanism of the character described, comprising means for thickening the seam portion of a welded article, and means cooperating therewith for removing a portion of the thickened seam.

8. Mechanism of the character described, comprising means for thickening the seam portion of a welded article, and means cooperating therewith for removing a portion of the thickened seam, said last mentioned means comprising a rotary cutting tool operated by the material being sheared.

9. In the method of forming welded articles, the steps comprising forming a weld under pressure, subsequently producing a metal flow adjacent the line of weld to remove impurities from the weld, and thereafter removing the impurities to leave a bead of predetermined form on the articles.

10. The combination with welding apparatus, of seam thickening means cooperating therewith.

11. The combination with welding apparatus, of hot seam thickening means cooperating therewith, and means for removing a portion of the thickened seam.

12. The combination with welding apparatus, of pressure applying means for subsequently producing a projecting bead on the article delivered by such apparatus, and means for removing a portion of such bead.

13. In the method of forming welded articles, the steps comprising forming a weld under pressure, and subsequently utilizing the remanant heat in the welded seam to assist in thickening the weld metal.

14. In a method of making welded articles, the steps including forming a weld under pressure, producing a metal flow adjacent the line of weld to remove impurities from the weld, removing the impurities and producing a further flow of metal adjacent the line of weld.

15. The combination with welding apparatus including means for forming a weld under pressure, of means for producing a metal flow adjacent the line of weld to remove impurities from the weld, means for removing the impurities, and means for producing a further flow of metal adjacent the line of weld.

16. The combination with a welding apparatus having pressure rolls for forcing together heated seam edges to effect a weld, of seam working means including forming rolls for pushing impurities from said seam up into a rib coincident therewith, and means for removing at least a portion of said rib.

17. In a method of welding, the steps including pressing together heated seam edges to form a weld, shaping the seam to form a rib of impurities outwardly thereof, and removing a portion of the rib.

18. In an apparatus for welding, the combination with welding rolls having continuous, smooth, arcuate faces for initially forcing hot seam edges together, of a grooved roll for subsequently shaping the seam for the removal of impurities.

19. In a method of continuously welding an axial seam in a metal length, the steps including continuously shaping the welded seam while hot to form a rib of impurities extending outwardly of the seam, and continuously removing at least a portion of the rib.

20. In an apparatus for removing a portion of the material extruded from a welded seam in a moving metal length, a rotatable, annular cutter, means for supporting said cutter for rotation in contact with the seam and at an angle thereto such as to rotate the cutter whereby it constantly presents a fresh cutting edge to the seam.

JAMES L. ADAMS, Jr.